(12) United States Patent
Otten et al.

(10) Patent No.: US 8,882,066 B2
(45) Date of Patent: Nov. 11, 2014

(54) BUOYANT CLAMP FOR TUBULAR MEMBERS

(75) Inventors: Gregory K. Otten, Houston, TX (US); Eugene J. Mannella, Richmond, TX (US)

(73) Assignee: Specialized Seal Design and Distribution, Inc., Houston, TX (US)

( * ) Notice: Subject to any disclaimer, the term of this patent is extended or adjusted under 35 U.S.C. 154(b) by 92 days.

(21) Appl. No.: 13/311,291

(22) Filed: Dec. 5, 2011

(65) Prior Publication Data

US 2013/0139359 A1 Jun. 6, 2013

(51) Int. Cl.
*F16B 1/00* (2006.01)

(52) U.S. Cl.
USPC . 248/230.8; 248/74.1; 248/74.4; 248/229.14; 405/211

(58) Field of Classification Search
USPC ............ 248/230.8, 74.3, 74.1, 74.4, 58, 68.1, 248/309.1, 51, 52, 205.2, 205.3; 24/16 R, 24/16 PB, 464, 298, 198, 200; 604/179, 604/180; 128/DIG. 6; 224/219, 221, 267; 174/70 R, 72 R, 72 C, 115, 116; 211/70.6, 85.13, 124, 89.01, 60.1; 405/171, 211, 212, 216, 224.2, 224.4; 441/133
See application file for complete search history.

(56) References Cited

U.S. PATENT DOCUMENTS

| | | | | |
|---|---|---|---|---|
| 2,417,741 A | * | 3/1947 | Dillon | 285/373 |
| 3,216,683 A | | 11/1965 | Girard | |
| 3,705,432 A | * | 12/1972 | Watkins, Jr. | 441/133 |
| 3,933,377 A | * | 1/1976 | Arrowood | 285/61 |
| 4,128,921 A | * | 12/1978 | Heinze et al. | 24/279 |
| 4,131,257 A | * | 12/1978 | Sterling | 248/67.5 |
| 4,273,465 A | * | 6/1981 | Schoen | 403/391 |
| 4,338,045 A | * | 7/1982 | Cour | 405/172 |
| 4,393,998 A | | 7/1983 | Allen et al. | |
| 4,439,070 A | * | 3/1984 | Dimmick | 405/216 |
| 4,477,207 A | | 10/1984 | Johnson | |
| 4,678,147 A | | 7/1987 | Barnes et al. | |
| 5,024,405 A | * | 6/1991 | McGuire | 248/73 |

(Continued)

FOREIGN PATENT DOCUMENTS

| | | |
|---|---|---|
| BR | PI0404834-2 B1 | 1/2009 |
| GB | 2419906 B | 1/2008 |
| WO | WO 2011028705 A1 | 3/2011 |

OTHER PUBLICATIONS

PCT/US2012/067233 International Search Report mailed Apr. 19, 2013.

(Continued)

*Primary Examiner* — Terrell McKinnon
*Assistant Examiner* — Monica Millner
(74) *Attorney, Agent, or Firm* — Timothy M. Honeycutt

(57) ABSTRACT

Various clamps for connecting one tubular member to another, methods of using and making such clamps are disclosed. In one aspect a clamp for coupling a first tubular member to a second tubular member is provided. The clamp includes a first clamp half and a second clamp half engageable with the first clamp half. The first and second clamp halves define a first through bore to accommodate the first tubular member and a second through bore to accommodate the second tubular member. A strap is adapted to circumscribe at least a portion of and bring into engagement the first and second clamp halves. The clamp is buoyant in water.

17 Claims, 8 Drawing Sheets

(56) References Cited

U.S. PATENT DOCUMENTS

| | | | |
|---|---|---|---|
| 5,180,008 A | | 1/1993 | Aldridge et al. |
| 5,205,520 A | * | 4/1993 | Walker .................... 248/74.1 |
| 5,261,633 A | * | 11/1993 | Mastro .................... 248/74.1 |
| 5,435,506 A | * | 7/1995 | Wiley ..................... 248/74.1 |
| 5,598,995 A | | 2/1997 | Meuth et al. |
| 5,711,639 A | * | 1/1998 | Tessier et al. ............ 405/171 |
| 5,730,399 A | | 3/1998 | Baginski |
| 5,791,657 A | | 8/1998 | Cain et al. |
| 5,799,916 A | * | 9/1998 | Lechner .................. 248/230.8 |
| 5,866,218 A | | 2/1999 | Meuth |
| 5,904,445 A | | 5/1999 | Meuth |
| 5,921,517 A | | 7/1999 | Meuth |
| 5,941,483 A | | 8/1999 | Baginski |
| 5,966,781 A | | 10/1999 | Geiger |
| 6,270,387 B1 | * | 8/2001 | Nesheim .................. 441/133 |
| 6,561,466 B1 | | 5/2003 | Myers et al. |
| 6,612,526 B2 | | 9/2003 | Meuth et al. |
| 6,726,166 B2 | * | 4/2004 | Goodman ............... 248/229.14 |
| 6,832,427 B2 | | 12/2004 | Meuth et al. |
| 6,892,990 B2 | * | 5/2005 | Pisczak ................... 248/74.4 |
| 7,168,673 B1 | * | 1/2007 | Piemonte et al. ......... 248/544 |
| 7,172,162 B2 | | 2/2007 | Mizukoshi et al. |
| 7,431,535 B2 | | 10/2008 | Cupolillo |
| 7,614,593 B2 | | 11/2009 | McClure et al. |
| 7,744,314 B2 | * | 6/2010 | Eide ..................... 405/224.2 |
| 7,749,035 B2 | * | 7/2010 | Oram et al. .............. 441/133 |
| 7,861,982 B1 | | 1/2011 | McClure |
| 8,020,812 B2 | * | 9/2011 | Matsuno et al. .......... 248/71 |
| 8,322,438 B2 | * | 12/2012 | Larson et al. ............ 166/367 |
| 2002/0096611 A1 | * | 7/2002 | Meuth et al. ............ 248/230.8 |
| 2003/0029978 A1 | * | 2/2003 | Meuth et al. ............ 248/230.8 |
| 2003/0029979 A1 | | 2/2003 | Meuth |
| 2006/0096197 A1 | | 5/2006 | Tollefson |
| 2007/0087639 A1 | * | 4/2007 | Oram et al. .............. 441/133 |
| 2008/0017385 A1 | * | 1/2008 | Gibson .................... 166/350 |
| 2008/0245933 A1 | | 10/2008 | Stokes |
| 2008/0251668 A1 | | 10/2008 | Stokes |
| 2008/0286049 A1 | * | 11/2008 | Eide ....................... 405/171 |
| 2010/0148018 A1 | | 6/2010 | Schoenau et al. |
| 2010/0258687 A1 | | 10/2010 | Celikkol |
| 2011/0186693 A1 | * | 8/2011 | McMiles et al. .......... 248/65 |
| 2013/0020801 A1 | * | 1/2013 | Li ........................... 285/417 |

OTHER PUBLICATIONS

PCT/US2012/067233 Partial ISR mailed Jan. 22, 2013.

* cited by examiner

BUOYANT CLAMP FOR TUBULAR MEMBERS

BACKGROUND OF THE INVENTION

1. Field of the Invention

This invention relates generally to clamping systems, and more particularly to a clamp to secure one tubular member or pipe to another.

2. Description of the Related Art

There are many circumstances where it is desirable to clamp a tubular to a pipe string and deploy the two in tandem into a well or other environment. One conventional example involves clamping an umbilical to a drill pipe or choke line. The umbilical may carry hydraulics, fiber optics, conventional conductor cables or even combinations of these. In subsea environments, the clamped tubular members may be run hundreds or thousands of feet below the rig, ship or platform. One disadvantage associated with some conventional clamps is mechanical complexity that slows attachment to the string. Another disadvantage of still other conventional clamps is weight, or more particularly negative buoyancy in water. Heavyweight clamps add to the load that must be carried by the rig equipment. Depending on the construction of the string, this added weight may not be trivial in comparison to the overall weight of the deployed string. However, negative buoyancy can complicate operations in the event of clamp failure, particularly if multiple pieces of the clamp detach and sink. The lost pieces represent capital expense, and could result in fouled equipment or an obstructed wellbore or riser, for example.

The present invention is directed to overcoming or reducing the effects of one or more of the foregoing disadvantages.

SUMMARY OF THE INVENTION

In accordance with one aspect of the present invention, a clamp for coupling a first tubular member to a second tubular member is provided. The clamp includes a first clamp half and a second clamp half engageable with the first clamp half. The first and second clamp halves define a first through bore to accommodate the first tubular member and a second through bore to accommodate the second tubular member. A strap is adapted to circumscribe at least a portion of and bring into engagement the first and second clamp halves. The clamp is buoyant in water.

In accordance with another aspect of the present invention, a clamp for coupling a first tubular member to a second tubular member is provided. The clamp includes a first clamp half that has a first end and a second end and a second clamp half that has a third end and a fourth end. The third end is pivotally coupled to the first end of the first clamp half. The first and second clamp halves define a first through bore to accommodate the first tubular member and a second through bore to accommodate the second tubular member. A latch mechanism is coupled to the second end of the first clamp half and the fourth end of the second clamp half and adapted to bring into engagement the first and second clamp halves. The clamp is buoyant in water.

In accordance with another aspect of the present invention, a method of clamping a first tubular member to a second tubular member is provided that includes engaging a first clamp half with the first and second tubular members and engaging a second clamp half with the first and second tubular members. The first and second clamp halves define a first through bore to accommodate the first tubular member and a second through bore to accommodate the second tubular member. At least a portion of the first and second clamp halves are circumscribed and brought into engagement with a strap. The clamp is buoyant in water.

In accordance with another aspect of the present invention, a method of clamping a first tubular member to a second tubular member is provided that includes engaging a first clamp half with the first and second tubular members and a second clamp half with the first and second tubular members. The first and second clamp halves define a first through bore to accommodate the first tubular member and a second through bore to accommodate the second tubular member. A latch mechanism coupled to the second end of the first clamp half and the fourth end of the second clamp half is engaged to bring into engagement the first and second clamp halves. The clamp is buoyant in water.

In accordance with another aspect of the present invention, a method of manufacturing a clamp adapted to clamp a first tubular member to a second tubular member is provided. The method includes fabricating a first clamp half and a second clamp half engageable with the first clamp half. The first and second clamp halves define a first through bore to accommodate the first tubular member and a second through bore to accommodate the second tubular member. The first and second clamp halves are buoyant in water.

BRIEF DESCRIPTION OF THE DRAWINGS

The foregoing and other advantages of the invention will become apparent upon reading the following detailed description and upon reference to the drawings in which.

DETAILED DESCRIPTION OF SPECIFIC EMBODIMENTS

Figure 1:
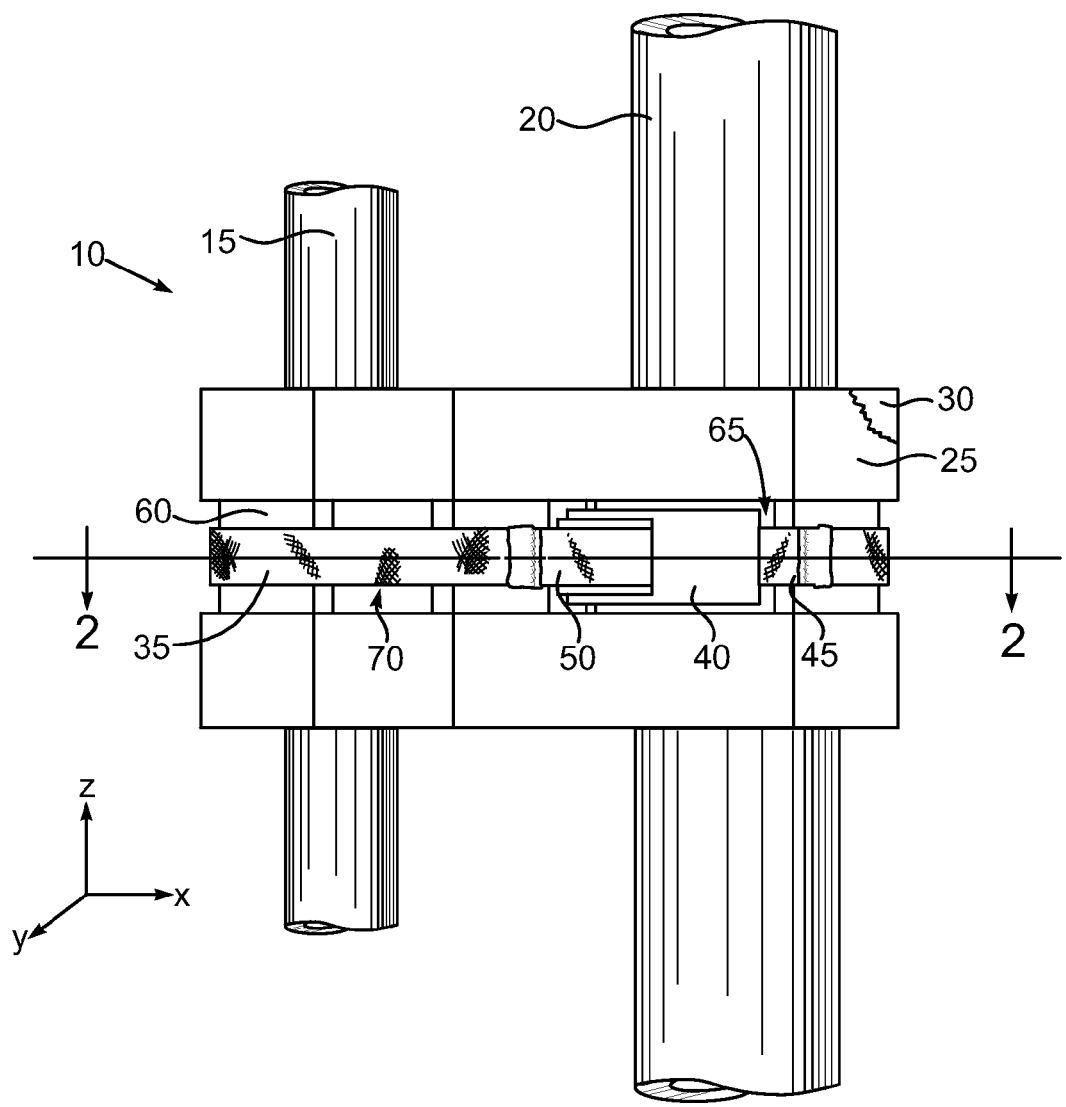
FIG. 1 is a front view of an exemplary embodiment of a clamp that may be used to clamp and hold in position a tubular member relative to another tubular member.

In the drawings described below, reference numerals are generally repeated where identical elements appear in more than one figure. Turning now to the drawings, and in particular to FIG. 1, therein is shown a front view of an exemplary embodiment of a clamp 10 that may be used to clamp and hold in position a tubular member 15 relative to a tubular member 20. The tubular member 15 may take on a variety of configurations such as umbilicals, fluid supply lines, or other types of tubular members. The tubular member 20 may similarly take on a large variety of configurations, such as, drill pipe, coiled tubing, production tubing, mud lines, hydraulic lines or other types of tubular members. In a typical application, several of the clamps 10 may be positioned at various intervals along the longitudinal lengths of the tubular members 15 and 20. The clamps 10 may provide stability during insertion, extraction and dwelling of the tubular members 15 and 20. An x, y, z coordinate system will be shown in various of the figures and otherwise used herein to provide a reference to describe the directions of movements of various members.

The clamp 10 consists of mating clamp halves, one of which is visible and labeled 25, and an opposing clamp half 30, which is only partially in view at the cutaway portion of the clamp half 25. The clamp halves 25 and 30 may be held in tight engagement with the tubular members 15 and 20 by way of a strap 35 that may be tightened by a fastener 40. The fastener 40 may take on a variety of different configurations. In this illustrative embodiment, the fastener 40 may be a ratchet buckle. One end 45 of the strap 35 may be fixed to the fastener 40 and the other end 50 may be advanced in the −x direction in order to tighten the strap 35. The strap 35 may be composed of a variety of materials, such as various types of fabrics, synthetic or otherwise, such as nylon, Kevlar® or other materials. In addition, the strap 35 may be composed of various types of flexible materials, such as polypropylene, stainless steel, well-known plastics or the like. To keep the strap 35 from sliding off of the clamp 10 in the z or −z directions, the clamp half 25 may be provided with a channel 60 that extends around the perimeter of the clamp half 25. The mating clamp half 30 includes a similar channel that is not visible in FIG. 1 but will be shown in subsequent figures. The channel 60 may include an inset 65 in order to accommodate the fastener 40. In addition, the channel 60 may include another inset 70 to facilitate the insertion of a cutting implement (not shown) in the event that the fastener is jammed and the strap 35 must be removed by cutting.

Figure 2:
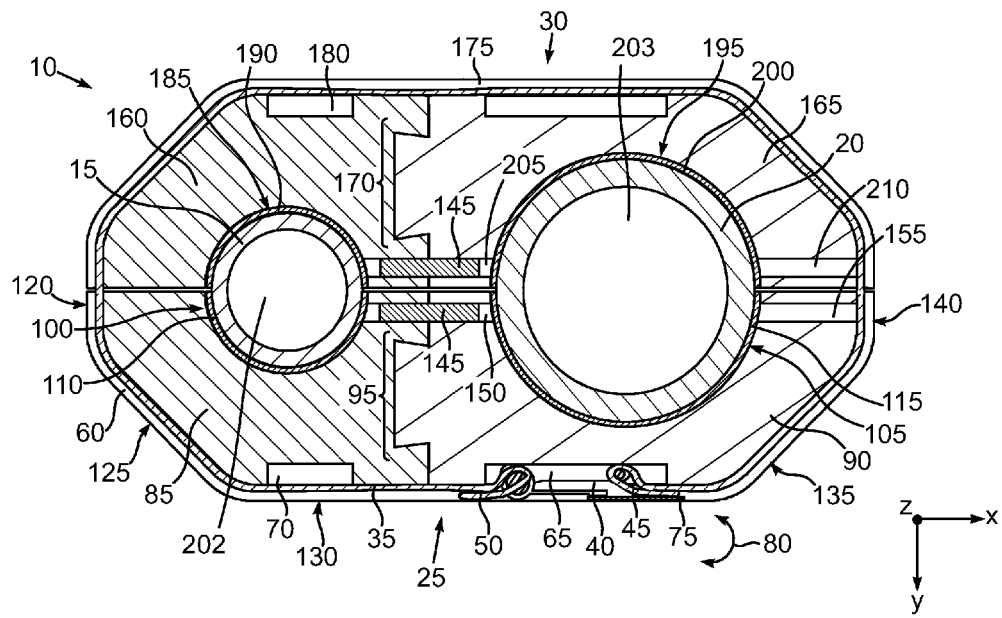
FIG. 2 is a sectional view of FIG. 1 taken at section 2-2.

Additional details of the clamp 10 may be understood by referring now to FIG. 2, which is a sectional view of FIG. 1 taken at section 2-2. Here, both of the mating clamp halves 25 and 30 are visible. Note that the fastener inset 65 and the strap cutting inset 70 are visible as well as the channel 60 and the fastener 40. The fastener 40 may include a lever 75 that may be pivoted in the x-y plane as indicated by the arrow 80 in order to advance the end 50 of the strap 35 to facilitate tightening. This will occur while the other end 45 of the strap 35 is fixed to the fastener 40. In this illustrative embodiment, the clamp half 25 may consist of a quarter section 85 coupled to another quarter section 90. Prior to clamping to the tubular members 15 and 20, the quarter sections 85 and 90 may be secured to one another by way of a joint 95. In this illustrative embodiment, the joint 95 may be a dovetail joint, however, other types of mechanical joints may be used. To accommodate and engage portions of the tubular members 15 and 20, the quarter section 85 is provided with a semicircular channel 100 and the quarter section 90 is provided with a similar, albeit larger semicircular channel 105. The semicircular channel 100 may be lined, at least partially, with a friction sleeve 110, which may be a half cylindrical shell and the channel 105 may be provided with a similar, albeit larger friction sleeve 115 which may also be configured as a half cylindrical shell. Additional details regarding the friction sleeves 110 and 115 will be discussed in detail in conjunction with FIG. 3.

Still referring to FIG. 2, the external footprint of the clamp halves 25 and 30 and thus the clamp 10 may take on a variety of shapes. In this illustrative embodiment, the clamp half 25 is provided with facets 120, 125, 130, 135 and 140, connected by curved surfaces. The clamp half 30 may be similarly fabricated with facets and curve surfaces (not labeled). The usage of facets 120, 125, 130, 135 and 140 along with curved surfaces makes the external profile of the clamp 10 somewhat more smooth and thus less prone to jamming against other objects during movement of the tubular members 15 and 20. In addition, the transitions between adjacent facets, such as between the facets 120 and 125, create bends that increase surface area to enhance the frictional engagement between the strap 35 and the clamp halves 25 and 30 and thus discourage slippage of the strap 35. Other benefits of the bends include smooth transitions for even tensioning of the strap 35 during tightening and reduction of localized stresses for enhanced service life.

To prevent relative movement between the quarter sections 85 and 90 along the z-axis except in certain desired circumstances, one or more shear pins, one of which is visible and numbered 145, may be positioned in a bore 150 that traverses from the quarter section 85 to the quarter section 90 in between the tubular members 15 and 20. To enable the shear pin 145 to access the bore 150, another bore 155 may be formed in the quarter section 90 in alignment with the bore 150. In this way, the bores 155 and 150 may be drilled or otherwise formed and thereafter the shear pin 145 inserted through the bore 155 and into the bore 150. The shear pin 145 may be composed of materials and of such size that it will fail in shear at a certain loading level. This may be desirable in circumstances where it is desired to prevent relative z-axis movement of the quarter sections 85 and 90 during normal operating conditions. However, in the event of stuck apparatus or other circumstances, the shear pin 145 and other shear pins not separately labeled may be deliberately failed by the operator by tugging, twisting or other movements of the tubular members 15 and 20. In this way the clamp 10 may be broken apart to facilitate a trip out or other movement of the tubular members 15 and 20.

The clamp half 30 may be configured as a mirror image of the clamp half 25 if desired. Thus, the clamp half 30 may consist of quarter sections 160 and 165 joined at a dovetail joint 170. Furthermore, together, the quarter sections 160 and 165 may include a channel 175 which mates up with the channel 60 to facilitate the placement of the strap 35. In addition, the quarter section 160 may include a strap cutting inset 180 and the quarter section 165 may include a fastener inset 185 that may be identical to the inset 70 and 65, respectively, in both size and position. In this way, the quarter sections 85 and 160 are interchangeable and the quarter sections 90 and 165 are similarly interchangeable. In addition, the quarter section 160 may include a semicircular channel 185 and friction sleeve 190 and the quarter section 165 may include a semicircular channel 195 and a friction sleeve 200 that may be configured as generally described elsewhere herein with regard to the channels 100 and 105 and the friction sleeves 110 and 115. Thus, the combination of the channels 100 and 185 define a through bore 202 to accommodate and engage the tubular member 15 and the combination of the channels 105 and 195 define a through bore 203 to accommodate and engage the tubular member 20. Note also that the clamp half 30 may include one or more shear pins 145 positioned in a bore 205 and inserted by way of a bore 210 that function like the bores 150 and 155 described above.

It is desirable for the clamp to exhibit a positive buoyancy relative to an ambient liquid environment, such as fresh or salt water. Accordingly, many of the components of the clamp 10 may be composed of relatively buoyant materials, such as for example, ultra high molecular weight polyethylene, high-density polyethylene, other well-known types of plastics or even corrosion resistant metallic materials such as stainless steel or aluminum. The individual components, such as the quarter sections 85, 90, 160 and 165 may be formed by molding, casting, machining, or other material fabrication processes appropriate for the materials in question. For example, high-density polyethylene may be readily injection molded while ultra high molecular weight polyethylene is resistant to injection molding. Yet, both ultra high-density polyethylene, stainless steel and aluminum may be machined. The term "water" used herein may be salt or fresh water.

The connection of the clamp 10 to the tubular members 15 and 20 will now be described in conjunction with FIG. 2. Initially, the quarter sections 85 and 90 that make up the clamp half 25 are joined by making up the dovetail joint 95 and inserting one or more of the shear pins 145. The same operation is performed for the clamp half 30. Next, the clamp halves 25 and 30 are positioned on opposite sides of the tubular members 15 and 20 and the strap 35 is wrapped around the perimeter of the clamp halves 25 and 30 in the channel segments 60 and 175 and the end 50 of the strap 35 is advanced through the fastener 40. The fastener 40 is next activated in order to tighten the strap 35 and bring the clamp halves 25 and 30 into tight engagement with the tubular members 15 and 20. This operation may be performed repeatedly along the longitudinal length of the tubular members 15 and 20, either as they are advanced relative to some apparatus such as a drill rig, ship or other structure, or while the tubular members 15 and 20 or some portion thereof are sitting static at some location. To remove the clamp 10, the process is reversed, that is, the fastener 40 may be loosened and the strap 35 slipped out of the channel segments 60 and 175 to release the clamp halves 25 and 30. If the fastener 40 is unable to disengage, then the strap 35 may be cut by, for example, using the strap cutting inserts 70 and 180 as access points.

Figure 3:
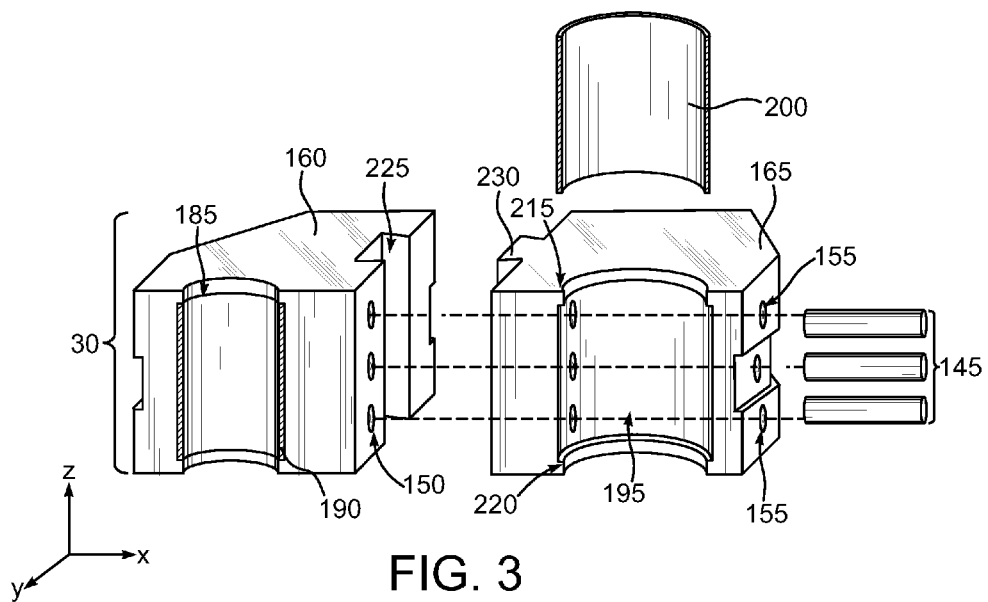
FIG. 3 is a partially exploded pictorial view of an exemplary clamp half.

Additional details of the features of the clamp 10 may be understood by referring now to FIG. 3, which is a partially exploded pictorial view of the clamp half 30. Here, the quarter section 160 is shown exploded from the quarter section 165 and the friction sleeve 200 is shown exploded from the quarter section 165. The annular recess 195 includes a downwardly facing shoulder 215 and an upwardly facing shoulder 220 that define an annular space to hold the friction sleeve 200. The annular space 185 is similarly configured to hold the friction sleeve 190. The friction sleeves 190 and 200 may be composed of a variety of materials that provide a tacky engagement with the tubular members 15 and 20 shown in FIGS. 1 and 2. Various materials include silicon carbide infused tape, hydrogenated nitrile butadiene rubber, natural rubber, silicone rubber, neoprene, soft plastics or other compliant materials. As noted above, multiple shear pins 145 may be used to restrain movement of the quarter sections 160 and 165 along, for example, the z-axis. In this illustrative embodiment, three such shear pins 145 may be used and passed through corresponding through bores 155 and positioned in bores 150. The shear pins 145 may be composed of a variety of materials that facilitate buoyancy and can fail in shear at some desire loading. Examples include PEEK, ultra high molecular weight polyethylene, high-density polyethylene, other well-known types of plastics or the like. To establish the dovetail joint 170, the quarter section 160 may be provided with a groove 225 and the quarter section 165 may be provided with a matching pin 230. The skilled artisan will appreciate that a variety of joint configurations may be used to secure the quarter sections 160 and 165 or any of the other embodiments disclosed herein. For example, T-slots or other types of joints may be used.

Figure 4:
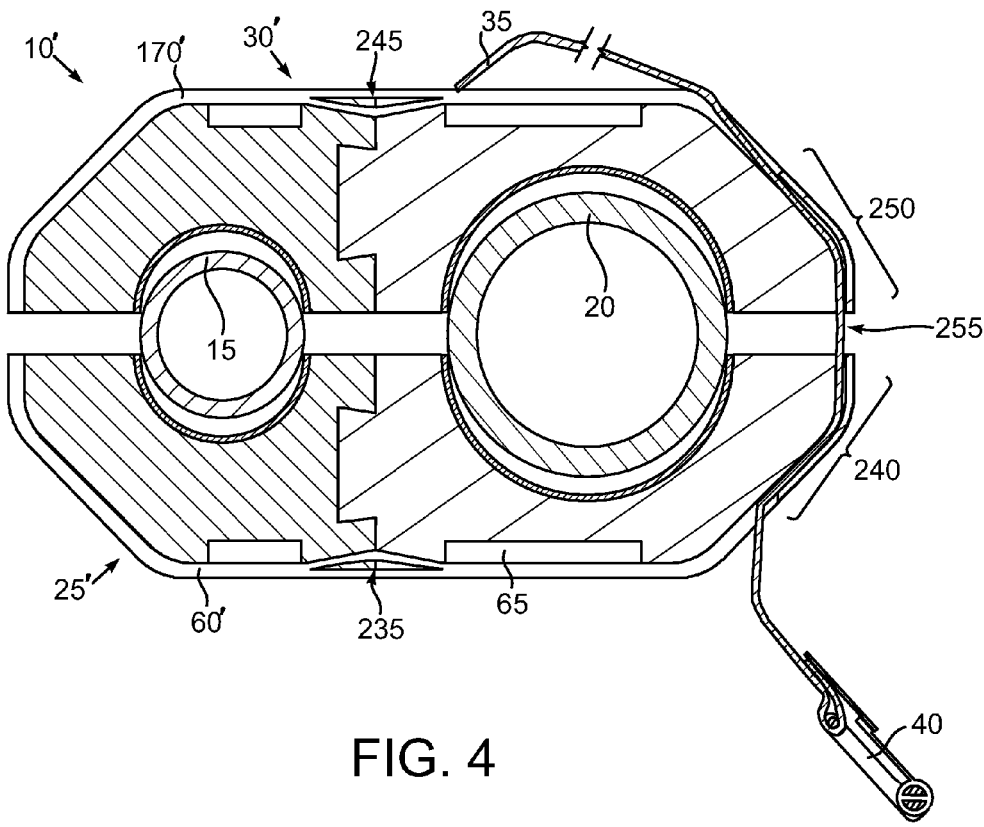
FIG. 4 is a sectional view like FIG. 2, but of an alternate exemplary embodiment of a clamp.

In the foregoing illustrative embodiment, the channel segments 60 and 175 of the clamp halves 25 and 30 are fabricated as continuously open channels around the entire periphery of the respective clamp halves 25 and 30. However, the channel segments 60 and 175 may be closed at various locations to provide certain benefits. In this regard, attention is now turned to FIG. 4, which is a sectional view like FIG. 2, but of an alternate exemplary embodiment of a clamp 10'. The clamp 10' may include clamp halves 25' and 30', which may be configured substantially like the clamp halves 25 and 30 described above with a few notable exceptions. Here, the channel 60' associated with the clamp half 25' may be covered at 235 and take a generally serpentine track. In addition, the channel 60' may be covered at 240. The channel 170' of the clamp half 30' may be similarly covered at 245 and include a serpentine segment there and also be covered at 250. The end 50 of the strap 35 may be passed first through the covered portion 240 of the channel 60', then into the covered portion 250 of the channel 170', and through the serpentine portion of the channel 170' proximate the covered portion 245, and subsequently in between the covered portion 235 and then finally secured to the fastener 40, which will be positioned in the inset 65. During connection to the tubular members 15 and 20, the strap 35 will be initially fed through the covered portions 240 and 250 and in this way the section 255 of the strap 35 may act as a hinge to facilitate the quick wrapping of the clamp halves 25 and 30 around the tubular members 15 and 20. The covered portions of the channels 60' and 70' at 235 and 245 and the serpentine footprints thereof provide enhanced frictional engagement between the strap 35 and the clamp halves 25' and 30'. This can serve to relieve some stress on the fastener 40 and can help prevent the strap 35 from loosening over time as the clamp 10' is deployed in, for example, a marine environment.

Figure 5:
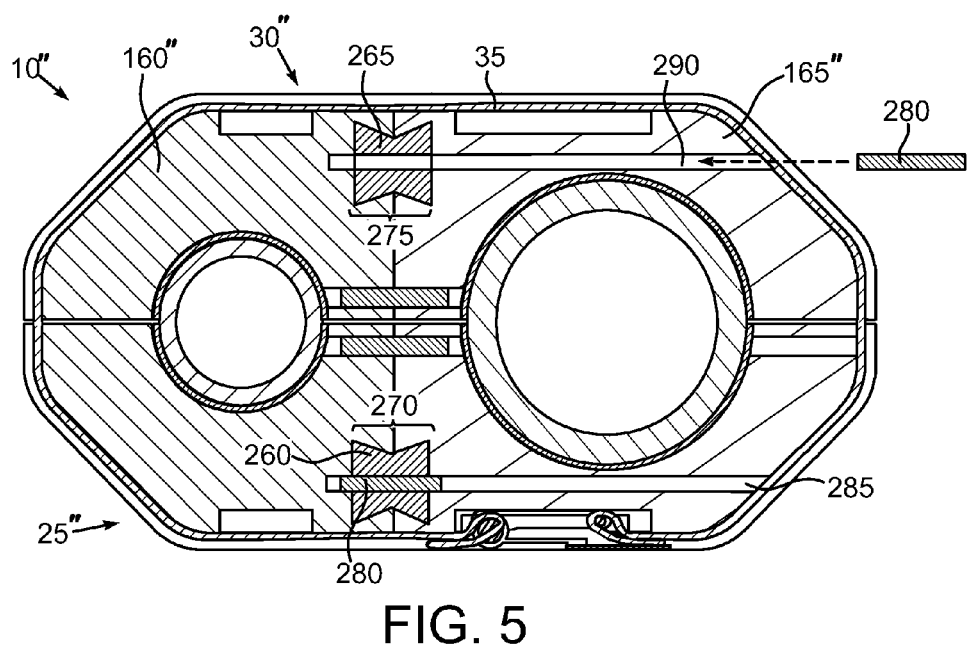
FIG. 5 is a sectional view like FIG. 4, but of another alternate exemplary embodiment of a clamp.
Figure 6:
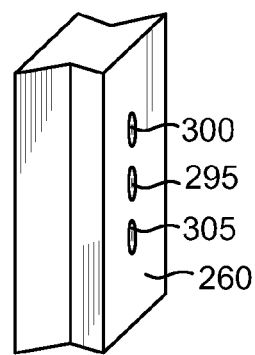
FIG. 6 is a pictorial view of an exemplary joining member.

In the foregoing illustrative embodiments, the mechanical joints that secure respective quarter sections consist of mating portions of the respective quarter sections such as the groove 225 and the pin 230 depicted in FIG. 3. However, in an alternate exemplary embodiment, a joint to join two respective quarter sections may be implemented by way of a joining member. In this regard, attention is now turned to FIG. 5, which is a sectional view like FIG. 2 but of an alternate exemplary embodiment of a clamp 10". This illustrative embodiment of the clamp 10" may be substantially identical to the clamp 10 with a few notable exceptions. Here, clamp halves 25" and 30" may be secured by way of the aforementioned strap 35. However quarter sections 85" and 90" may be secured by way of a joining member 260. The joining member 260 may be provided with an hourglass cross section as depicted or other shape that provides a mechanical engagement between the quarter sections 85" and 90". The quarter sections 160" and 165" may be similarly joined by a joining member 265. Together the quarter sections 85" and 90" will define a bore 270 and the sections 160" and 165" will define a bore 275 when brought into alignment. To join the quarter sections 85" and 90", the joining member 260 is dropped into the bore 270 and by way of gravity or impact loading by way of a mallet or other implement. To ensure that the joining member 260 does not pop out of position, one or more shear pins 280 may be passed through the joining member 260. A similar pin 280 may be positioned in the joining member 265. Respective through bores 285 and 290 may be provided to facilitate the insertion of the sheer pins 280. Additional details of the joining members 260 and 265 may be understood by referring now to FIG. 6, which is a pictorial view of the joining member 265. In addition to the through bore 295, the joining member 265 may be sandwiched by additional through bores 300 and 305 to facilitate the insertion of additional sheer pins such as the shear pin 280. The joining member 265 and the shear pins 280 may be composed of a variety of materials that facilitate buoyancy and can fail in shear or otherwise at some desired loading. Examples include PEEK, ultra high molecular weight polyethylene, high-density polyethylene, other well-known types of plastics or the like.

Figure 7:
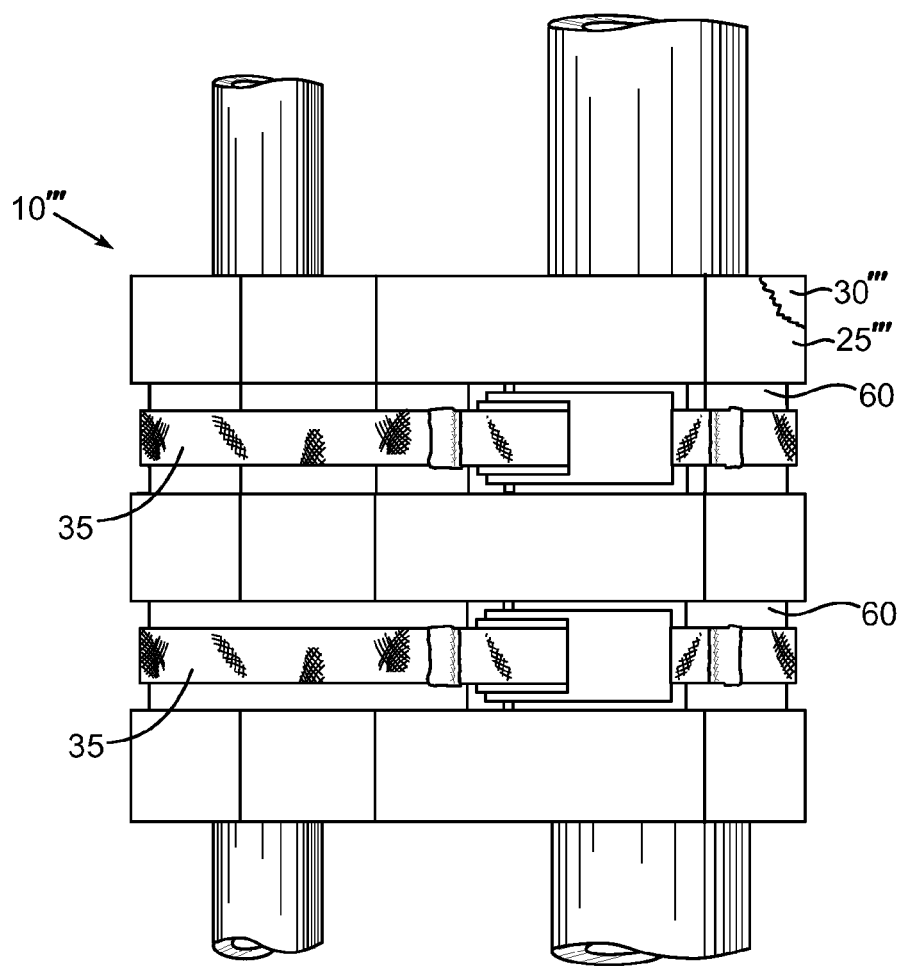
FIG. 7 is a front view of another alternate exemplary embodiment of a clamp.

Any of the disclosed embodiments of the clamps may include more than one strap or latching mechanism. In this regard, attention is now turned to FIG. 7, which is a front view of an alternate exemplary embodiment of a clamp 10''' which may be configured substantially like the clamp 10 depicted in FIG. 1 albeit with the addition of two straps 35 and two channels 60 that may be configured as described above. The straps 35 may include any of the aforementioned types of fasteners and the clamp 10''' itself may include any of the other alternative features described elsewhere herein.

Figure 8:
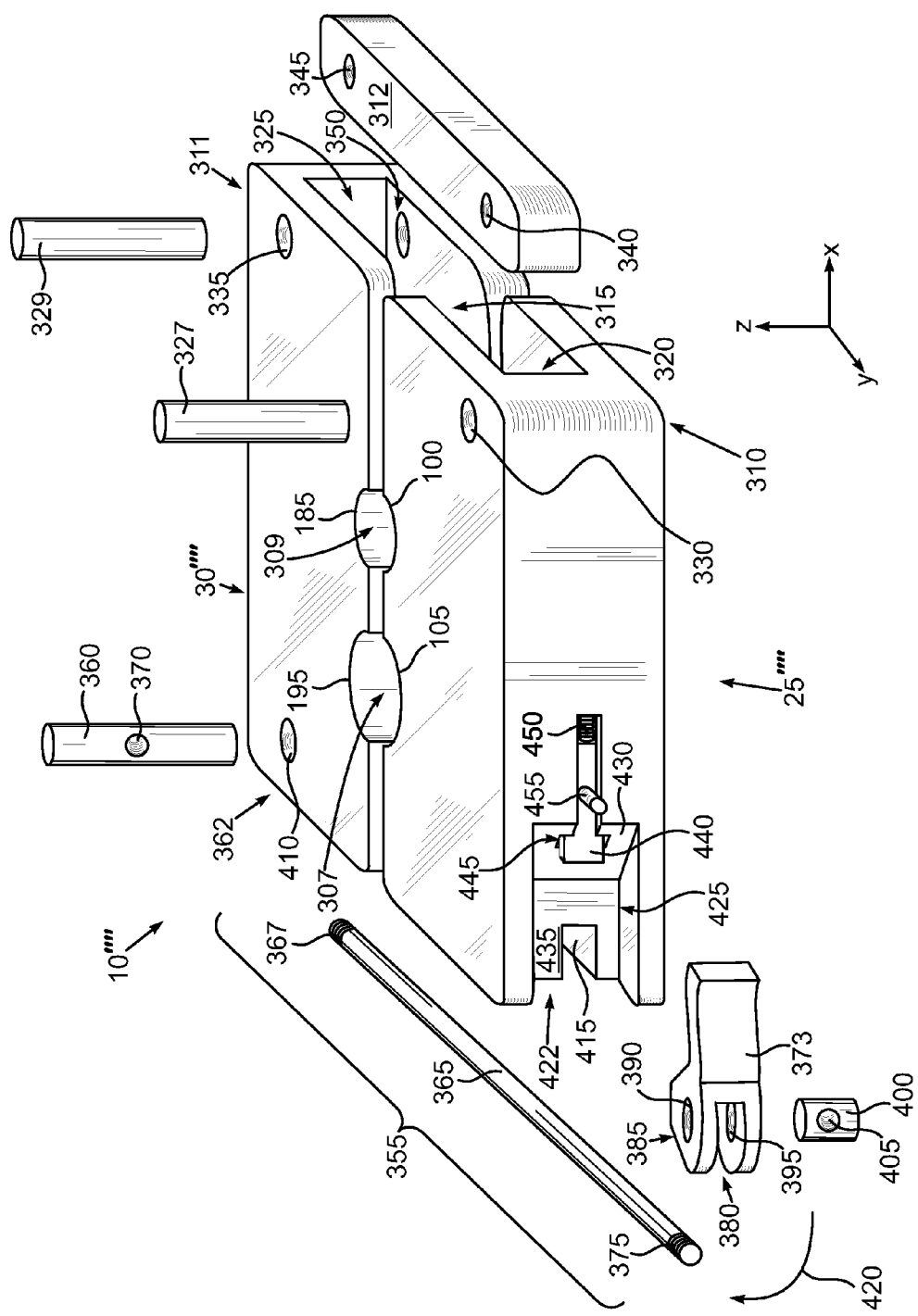
FIG. 8 is a partially exploded pictorial view of another alternate exemplary embodiment of a clamp.

Another alternate exemplary embodiment of a clamp 10'''' may be understood by referring now to FIG. 8, which is a pictorial view with certain components of the clamp 10'''' exploded. In this illustrative embodiment, the clamp 10'''' includes mating clamp halves 25'and 30'''' that include respective channels 105 and 195 that are designed to define a through bore 307 to cooperatively accommodate and engage the tubular member 20 and respective channels 100 and 185 that are designed to define a through bore 309 to cooperatively engage and accommodate the tubular member 15 depicted in the other figures. The channels 100, 105, 185 and 195 may include the friction sleeves such as the sleeves 110, 115, 190 and 200 depicted in FIG. 2 and described elsewhere herein. Corresponding ends 310 and 311 of the clamp halves 25'''' and 30'''', respectively, may be secured to one another pivotally by way of a pivot member 312 that is designed to be seated in an opening 315. The opening 315 consists of opposing cutouts 320 and 325 in the clamp halves 25'''' and 30'''', respectively. To pivotally secure the clamp halves 25'''' and 30'''' to the pivot member 312 following insertion thereof in the opening 315, pins 327 and 329 may be inserted into respective bores and inserted through bores 340 and 345 formed in the pivot member 312 and a bore 350 and another bore that is not visible but is in the clamp half 25'''' and vertically aligned with the bore 330. The pins 327 and 329 and the bores 330, 335 and 350 and the bore that is in the clamp half 25'''' and aligned with the bore 330 but not shown may be advantageously fabricated with interference fit dimensions to provide a tight engagement with the clamp halves 25'''' and 30''''. However, the bores 340 and 345 are advantageously fabricated with an inner diameter that provides for ready pivoting movement of the pins 327 and 329 through the bores 340 and 345 to enable the clamp halves 25'''' and 30'''' to be easily pivoted about the z-axis to facilitate clamping and unclamping.

This illustrative embodiment is provided with a latch mechanism 355 that includes a rotating pin 360 pivotally connected to an end 362 of the clamp half 30'''', a shaft 365 with a threaded end 367 that is designed to threadedly engage a bore 370 in the rotating pin 360, and a cam lever 373 that is designed to connect to the other threaded end 375 of the shaft 365. The cam lever 373 includes a fork 380 with a pair of camming surfaces only one of which is fully visible and labeled 385. The fork 380 also includes vertically aligned bores 390 and 395 in which a connection pin 400 is partially positioned. The connection pin 400 includes a threaded through bore 405 that is designed to threadedly engage the threaded end 375 of the shaft 365 after the pin 400 is positioned in the through bores 390 and 395 to provide a pivoting connection between the lever 373 and the shaft 365. The threaded end 367 of the shaft 365 is connected to the pivot pin 360 by way of the threaded bore 370 after the pivot pin 360 is positioned in a bore 410 formed in the clamp half 30''''. The clamp half 25'''' includes a slot 415 that extends along the y-axis and is aligned with a mating slot (not visible) in the clamp half 30''''. In this way, the pivot pin 360 may be inserted into the bore 410 and rotated to an appropriate angle through the x-y plane so that the threaded end 367 may be threaded into the bore 370 and then the lever 373 connected to the end 375 by way of the connection pin 400. It does not matter whether the end 367 is torqued into the bore 370 first or whether the lever 373 is first attached to the end 375 and then the shaft end 367 torqued into the bore 370. Regardless, to activate the clamping mechanism 355, the shaft 365 including the lever 373 is rotated through the x-y plane in the direction of the arrow 420 and the clamp halves 25'''' and 30'''' are away from one another in the x-y plane prior to engagement with the tubular members 15 and 20 depicted in other figures. Once the clamp halves 25'''' and 30'''' are in position and manually pivoted by the operator toward one another, then the latch mechanism 355, and in particular the shaft 365 and the lever 373, are pivoted in the direction opposite of the arrow 420 in the x-y plane so that the shaft 365 is seated in the slot 415. To lock the lever 373 in position, an end 422 of the clamp half 25'''' may be provided with a cut-out 425 that includes a sloped surface 430 that connects with a flat surface 435. The flat 435 may be sloped downward toward the bottom of the sloped surface 430. A latch pin 440 projects from a slot 445 in the clamp half 25'''', which opens to the sloped surface 430. The latch pin 440 is spring biased by way of a biasing member 450, which may be a coil spring or other type of biasing member. If desired, the connection between the biasing member 450, which may be mechanical or by way of solder or other means, may be sufficient to retain the pin 440 in the slot 445. Optionally, an additional alignment pin 455 may be connected to the latch pin 440 and project outwardly from the slot 445 as shown. Once the shaft 365 is positioned in the slot 415, the lever 373 may be rotated opposite to the direction of the arrow 420 in the x-y plane to engage and force the latch pin 440 in the x-direction until the lever 373 clears the latch pin 440, at which point the latch pin 440 will snap in the −x direction over and lock the lever 373 in place. The optional pin 455 may serve as a handle for the operator to move the latch pin 440 in the x-direction to release the lever 373 and unclamp the clamp 10''''. As with the other disclosed embodiments, many of the components of the clamp 10'''' may be composed of light weight materials that enhance buoyancy such as, for example, ultra high molecular weight polyethylene, high-density polyethylene, other well-known types of plastics or even corrosion resistant metallic materials such as stainless steel or aluminum and formed by molding, casting, machining, or other material fabrication processes appropriate for the materials in question.

Figure 9:
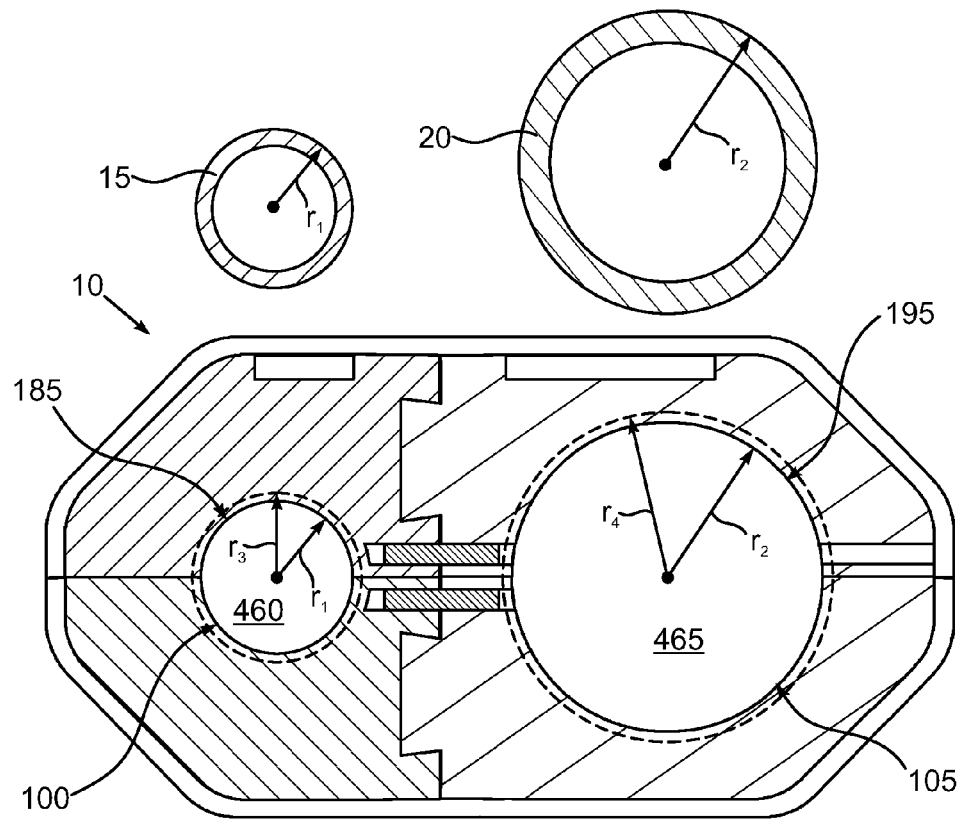
FIG. 9 is a sectional view like FIG. 2, but depicting exemplary bore modification capability.

Any of the disclosed embodiments of the clamps may be initially fabricated with annular channels suitable to clamp the smallest outer dimension or diameter (OD) tubular members, such as the tubular members 15 and 20 shown in FIG. 2, that are likely to be encountered at a job site. In this regard, attention is now turned to FIG. 9, which is a sectional view like FIG. 2 of the clamp 10 but with tubular members 15 and 20 exploded and without a strap in place. Here, the channels 100 and 185 may be provided with some initial dimensions that are designed to accommodate the tubular member 15 with some nominal OD represented by radius $r_1$ and the channels 105 and 195 may be provided with some initial dimensions that will accommodate a tubular member 20 with a nominal OD corresponding to a radius $r_2$. However, situations may arise where tubular members that have larger dimensions than radii $r_1$ and $r_2$ must be clamped. In this regard, the bore 460 defined by the channels 100 and 185 may be enlarged to some radius $r_3$ to accommodate a larger size of the tubular member 15 and the bore 465 defined by the channels 105 and 195 may be enlarged to some larger radius $r_4$ that corresponds to a larger size of tubular member 20 encountered. The process of enlarging the bores 460 and 465 may be performed by drilling, milling or other material removal techniques. In this way, the effective number of sizes of a given clamp that have to be manufactured may be reduced while still providing the capability to accommodate different varieties of tubular members that may be present at a job site. It should be understood that any of the disclosed embodiments may be fabricated to accommodate the same size or different sized tubular members, such as different sized tubular members 15 and 20.

Figure 10:
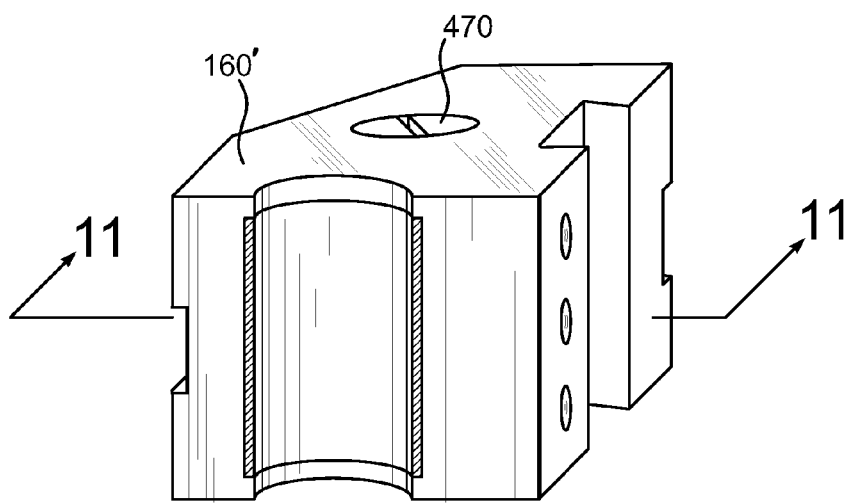
FIG. 10 is a pictorial view of an alternate exemplary clamp quarter section.
Figure 11:
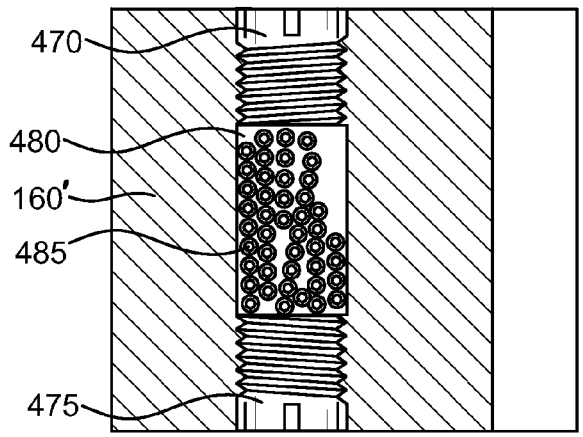
FIG. 11 is a sectional view of FIG. 10 taken at section 11-11.

The buoyancy of a clamp section or half of any of the disclosed embodiments of the clamp may be enhanced by the addition of an air space alone or filled with buoyant particles. In this regard, attention is now turned to FIG. 10, which is a pictorial view of an alternate exemplary embodiment of the clamp quarter section now labeled 160'. The quarter section 160' may be substantially identical to the quarter section 160 depicted in FIG. 3 and described elsewhere herein. However, an air chamber (not visible in FIG. 10) that is sealed at one end with a plug 470 may be provided to enhance the buoyancy of the quarter section 160'. Additional details of the quarter section 160' may be understood by referring now also to FIG. 11, which is a sectional view of FIG. 10 taken at section 11-11. As noted above, the plug 470 seals an upper end of an internal chamber 480 that may extend through the depth of the quarter section 160'. The other end of the chamber 480 may be sealed by a corresponding plug 475. Note that the plugs 470 and 475 may be thread plugs as depicted or secured to the quarter section 160' by other methods, such as adhesives or welding, for example. The chamber 480 may remain empty or be filled with a plurality of buoyant particles 485. In an exemplary embodiment, the buoyant particles 485 may consist of small glass spheres that each contain a small amount of air or other gas. Any or all of the quarter sections that make up a clamp may be fitted with such one or more of the chamber 480 and plugs 470 and 475. If the high ambient pressures will be encountered, such as at deep depths, care should be taken to account for pressure differences between the pressure in the chamber 485 and the ambient. The skilled artisan will appreciate that the provision of such chambers 480 may enhance the buoyancy of quarter sections that are made of otherwise low buoyancy material, such as aluminum or other metallic materials.

Figure 12:
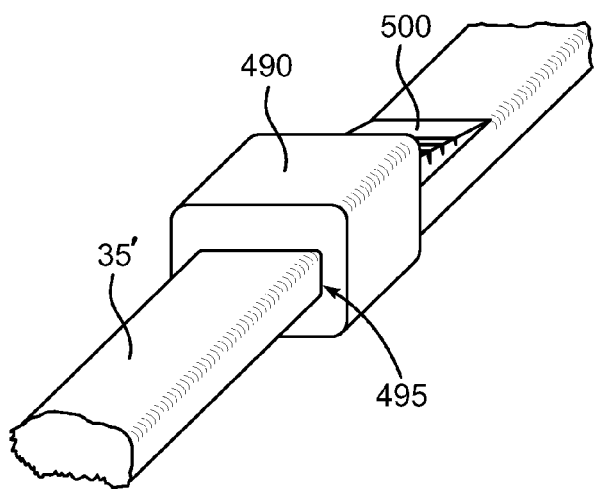
FIG. 12 is a pictorial view of a portion of an alternative exemplary clamp strap.

As noted above, a variety of different types of fastening techniques may be used to secure the ends of a strap used to clamp together the mating halves of a clamp. For example, and as shown in FIG. 12, an alternate exemplary strap 35' may use a ratchet fastener. In this regard, a ratchet fastening body 490 may be provided with a suitable opening 495 through which a ratcheted end 500 of the strap 35' may project and engage the ratchet and be locked into position. The ratchet mechanism may be a one-time usage type of mechanism wherein the strap would have to be cut away in order to remove a clamp or provide it with some sort of release mechanism that is well known to the skilled artisan.

Figure 13:
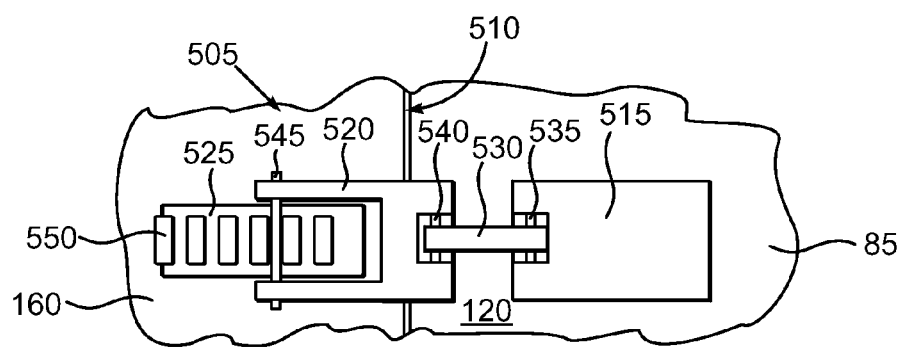
FIG. 13 is a side view of a portion of an exemplary clamp and an alternate exemplary fastener or latch mechanism.

FIG. 13 is side view quarter sections 85 and 160 and of another alternate exemplary fastener or latch mechanism 505 that may be used to bring together portions of a clamp. Here, the fastener or latch mechanism is positioned across a joint 510 between the quarter sections 85 and 160. Note that the facet 120 is in view. The fastener or latch mechanism 505 may be configured as a buckle that includes a base 515 that is secured to the quarter section 85 and a latch 520 that is pivotally coupled to the base 515. The latch 520 is operable to pivot in and out of the page to engage a track 525 that is secured to the quarter section 160. The latch 520 may be pivotally secured to the base 515 by way of a connecting rod 530 that is connected to the base 515 by a pin 535 and to the latch 520 by way of a pin 540. The latch 520 may be a forked member as disclosed that includes a pin 545 that is operable to engage the spaces between teeth 550 of the rack 525. Any or all of the components of the fastener or latch mechanism 505 may be composed of light weight but strong materials such as aluminum, stainless steel or the like. The base 515 and the rack 525 may be secured to the quarter sections 85 and 160, respectively, by screws, rivets or other fastening techniques. Note that the fastener or latch mechanism 505 could be positioned at other locations and could also be used with the various straps disclosed herein.

Figure 14:
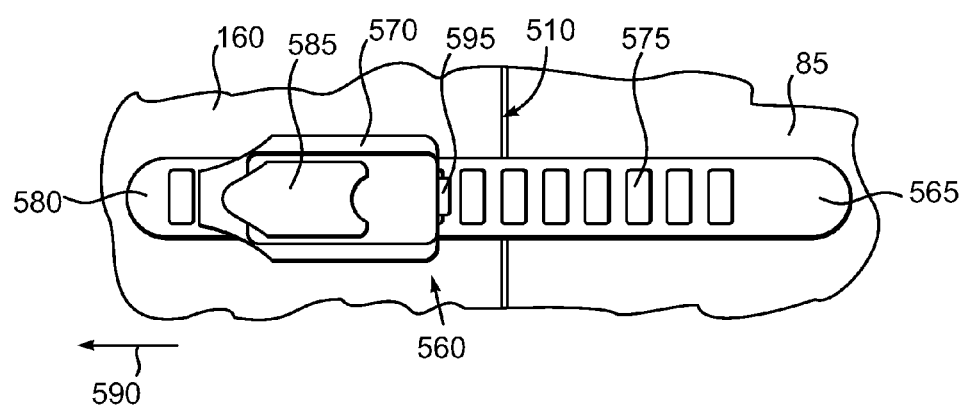
FIG. 14 is a side view of a portion of an exemplary clamp and another alternate exemplary fastener or latch mechanism.

In still another alternate exemplary embodiment depicted in FIG. 14, a fastener or latch mechanism 560 may be used to secure the quarter sections 85 and 160 together. FIG. 14 is a side view of the quarter sections 85 and 160 like FIG. 13. The fastener 560 may consist of a ladder strap 565 that is secured to the quarter section 85 and a latch 570 that is secured to the quarter section 160. The ladder strap 565 includes plural teeth 575 that are longitudinally spaced along the length of the strap 560. The free end 580 of the strap 560 is movable through the latch 570 when an activating button 585 is depressed, and advanced in the direction of the arrow 590 to tighten the quarter sections 85 and 160 into engagement at the joint 510. The latch 570 includes a rotating pinion 595 that is operable to engage the individual teeth 575 of the strap 565. The various components of the fastener 560 may be manufactured from light weight materials such as well known plastics or even stainless steel as desired. Note that the fastener or latch mechanism 560 could be positioned at other locations and also be used with the various straps disclosed herein.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents and alternatives falling within the spirit and scope of the invention as defined by the following appended claims.

What is claimed is:

1. A clamp for coupling a first tubular member to a second tubular member, comprising:
   a first clamp half having a first quarter section coupled to a second quarter section;
   a second clamp half engageable with the first clamp half, the second clamp half having a third quarter section coupled to a fourth quarter section, the first and second clamp halves defining a first through bore to accommodate the first tubular member and a second through bore to accommodate the second tubular member;
   a strap adapted to circumscribe at least a portion of and bring into engagement the first and second clamp halves; and
   whereby the first quarter section and the third quarter section are interchangeable and the second quarter section and the fourth quarter section are interchangeable and the clamp is buoyant in water.

2. The clamp of claim 1, comprising at least one shear pin having a first end positioned in the first quarter section and a second end positioned in the second quarter section.

3. The clamp of claim 1, wherein the first and second quarter sections are coupled together by a joint.

4. The clamp of claim 3, wherein the joint comprises a dovetail joint.

5. The clamp of claim 3, wherein the joint comprises a joining member having a first portion engaging the first quarter section and a section portion engaging the second quarter section.

6. The clamp of claim 1, comprising a fastener to couple opposing ends of the strap.

7. The clamp of claim 1, comprising a friction sleeve positioned at least one of the first and second through bores.

8. The clamp of claim 7, wherein the friction sleeve comprises a compliant material.

9. A method of clamping a first tubular member to a second tubular member, comprising:
   engaging a first clamp half with the first and second tubular members;
   engaging a second clamp half with the first and second tubular members, the first and second clamp halves defining a first through bore to accommodate the first tubular member and a second through bore to accommodate the second tubular member;
   circumscribing at least a portion of and bringing into engagement the first and second clamp halves with a strap; and
   whereby the clamp is buoyant in water.

10. The method of claim 9, comprising securing opposite ends of the strap with a fastener.

11. The method of claim 9, wherein the first clamp half comprises a first quarter section coupled to a second quarter section and at least one shear pin having a first end positioned in the first quarter section and a second end positioned in the second quarter section, the method further comprising deliberately failing the at least one shear pin to disengage the clamp from the first and second tubular members.

12. A method of manufacturing a clamp adapted to clamp a first tubular member to a second tubular member, comprising:
   fabricating a first clamp half and a second clamp half engageable with the first clamp half, the first and second clamp halves defining a first through bore to accommodate the first tubular member and a second through bore to accommodate the second tubular member;
   whereby the first and second clamp halves are buoyant in water.

13. The method of claim 12, comprising coupling a strap to the first and second clamp halves, the strap adapted to circumscribe at least a portion of and bring into engagement the first and second clamp halves.

14. The method of claim 12, wherein the first and second clamp halves comprise a polymer.

15. The method of claim 14, wherein the first and second clamp halves are molded.

16. The method of claim 14, wherein the first and second clamp halves are machined.

17. The method of claim 12, wherein the first and second through bores having first and second inner dimensions to accommodate first and second tubular members having first and second outer dimensions, the method further comprising enlarging the first and second through bores to accommodate tubular members having outer dimensions larger than the first and second outer dimensions.

\* \* \* \* \*